Nov. 26, 1968  E. O. SCHWEITZER, JR  3,413,548
ELECTRIC CURRENT RESPONSIVE MEANS INCLUDING
A PORTABLE MAGNET INDICATOR
Filed Oct. 5, 1964  3 Sheets-Sheet 1
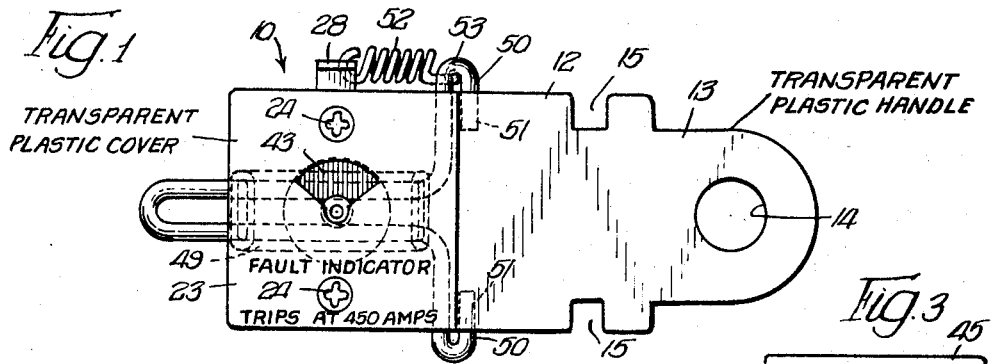
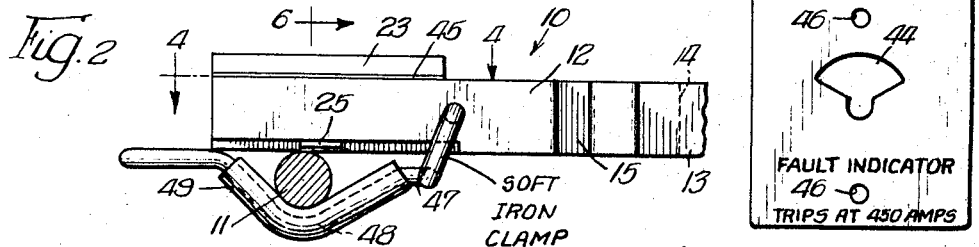
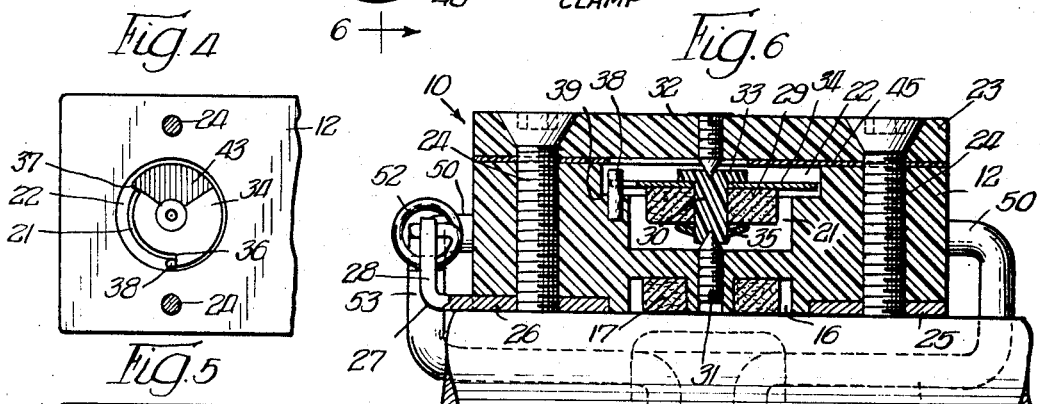
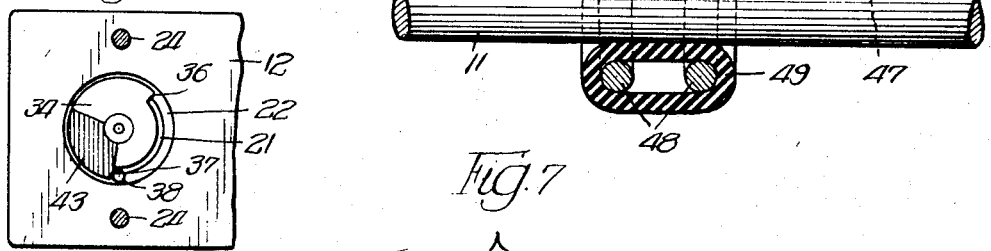
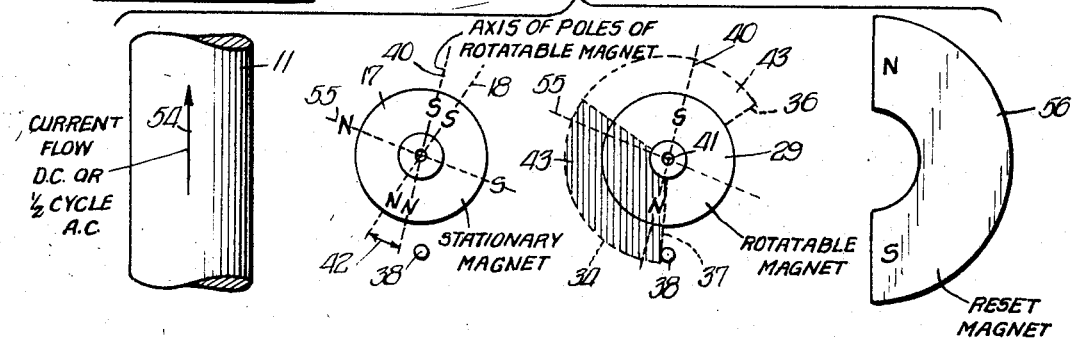

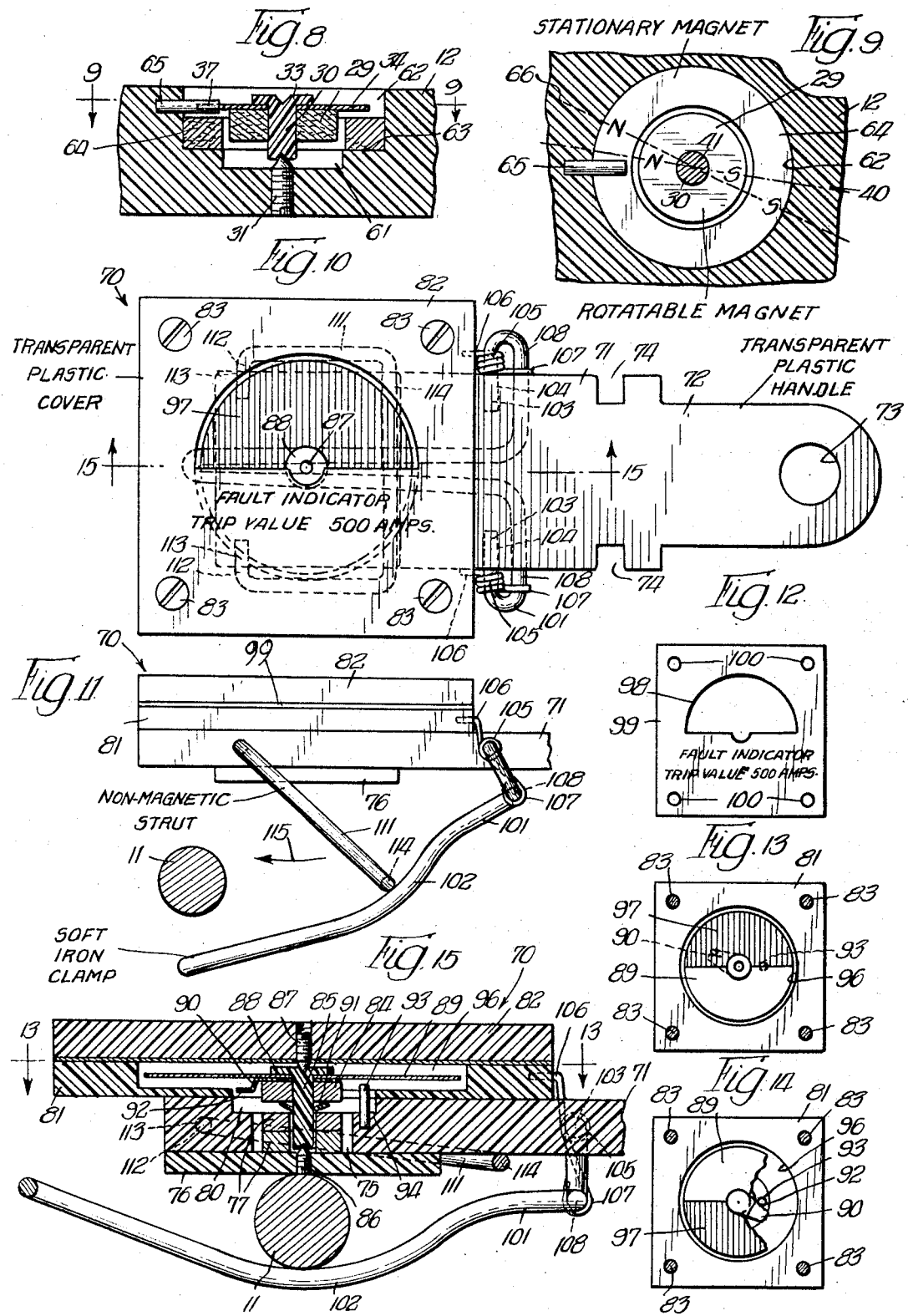

Nov. 26, 1968   E. O. SCHWEITZER, JR   3,413,548
ELECTRIC CURRENT RESPONSIVE MEANS INCLUDING
A PORTABLE MAGNET INDICATOR
Filed Oct. 5, 1964   3 Sheets-Sheet 3

United States Patent Office 3,413,548
Patented Nov. 26, 1968

3,413,548
ELECTRIC CURRENT RESPONSIVE MEANS INCLUDING A PORTABLE MAGNET INDICATOR
Edmund O. Schweitzer, Jr., 1002 Dundee Road,
Northbrook, Ill. 60062
Filed Oct. 5, 1964, Ser. No. 401,621
16 Claims. (Cl. 324—133)

ABSTRACT OF THE DISCLOSURE

Stationary and rotatable permanent magnets are located in the magnetic field generated by current flow in a conductor in such relation that the rotatable permanent magnet is held in a non-indicating position until the current flow exceeds a predetermined value whereupon it rotates to an indicating position.

---

This invention relates, generally, to electric current measuring means, has particular relation to devices for indicating that a predetermined flow of either alternating current or direct current has taken place in a conductor, and constitutes an improvement over the invention of my copending application Ser. No. 491,000, filed Sept. 28, 1965.

This invention employs a relatively stationary permanent magnet having north and south poles located along an axis for positioning along the current path in a conductor and within the magnetic field generated thereby. Another permanent magnet is mounted for rotation about an axis perpendicular to the axis of the poles of the permanent magnet with its north and south poles along an axis that intersects said axis of rotation. A stop is provided for preventing rotation of the rotatable permanent magnet in a first position such that it is held in this position by the repelling forces exerted by like poles of the stationary and rotatable permanent magnets. Instead of a stop, a second pair of north and south poles can be provided on one of the permanent magnets. On flow of predetermined current in the conductor and generation of a magnetic field thereby sufficient to overcome the repelling forces caused by the like poles of the permanent magnets, the rotatable magnet is rotated to the second position in which it is held under the influence of the attracting forces of unlike poles. By providing a target that moves with the rotatable magnet and is visible only in said second position, an indication is given that the current flow in the conductor has at least been equal to said predetermined value. When the stop is employed, the rotatable permanent magnet is rotated only in response to flow of direct current in the conductor in one direction or to those half cycles of alternating current that flow in said one direction. It is responsive to the flow of direct current in either direction and to either of the half cycles of flow of alternating current when the second set of north and south poles is employed instead of the stop. The stationary and rotatable permanent magnets with the target are mounted on a handle that can be manipulated by a live line stick and detachably clamped to the conductor. The clamp includes a member of ferrous metal for partially surrounding the conductor, the ferrous metal member being spring biased and in one embodiment cooperating with a strut to facilitate application to the conductor. The relatively stationary and rotatable permanent magnets can be positioned coaxially, one above the other or concentrically. A transparent cover overlies the rotatable permanent magnet and target and thereby renders it inaccessible for mechanical resetting. Resetting is accomplished by use of a permanent magnet which is positioned with its poles adjacent opposite poles of the rotatable permanent magnet in said first position thereof either directly or by rotating the resetting magnet to this position. The rotatable permanent magnet and target carried thereby are rotated to the first or non-indicating position in this manner where they are held by the repelling forces of the like poles of the relatively stationary and relatively rotatable permanent magnets.

In the drawings:

FIG. 1 is a top plan view, at full scale, of a predetermined current flow responsive means or fault indicator embodying this invention.

FIG. 2 is a view, in side elevation, of the device shown in FIG. 1.

FIG. 3 is a top plan view of the mask that is positioned between the handle and the cover of the device shown in FIGS. 1 and 2.

FIG. 4 is a horizontal sectional view taken generally along the line 4—4 of FIG. 2 and shows the target in the indicating position.

FIG. 5 is a view, similar to FIG. 4, showing the target in the non-indicating position.

FIG. 6 is a vertical sectional view at an enlarged scale and taken generally along the line 6—6 of FIG. 2.

FIG. 7 illustrates somewhat diagrammatically the manner in which the device as shown in the preceding figures operates.

FIG. 8 is a vertical sectional view of a modified form of the device showing how the relatively stationary and rotatable permanent magnets can be concentrically arranged.

FIG. 9 is a horizontal sectional view taken generally along the line 9—9 of FIG. 8.

FIG. 10 is a top plan view at full scale showing another embodiment of the predetermined current flow responsive means or fault indicator in which the target is substantially larger than the target for the device shown in FIGS. 1 and 2.

FIG. 11 is a view, in side elevation, of the device shown in FIG. 10.

FIG. 12 is a top plan view at a reduced scale of the mask for the device shown in FIG. 10.

FIG. 13 is a horizontal sectional view taken generally along the line 13—13 of FIG. 15 and shows, at a reduced scale, the position of the target in the indicating position.

FIG. 14 is a view, similar to FIG. 13, but showng the position of the target in the non-indicating position.

FIG. 15 is a vertical sectional view, at an enlarged scale, taken generally along the line 15—15 of FIG. 10.

Figure 16:
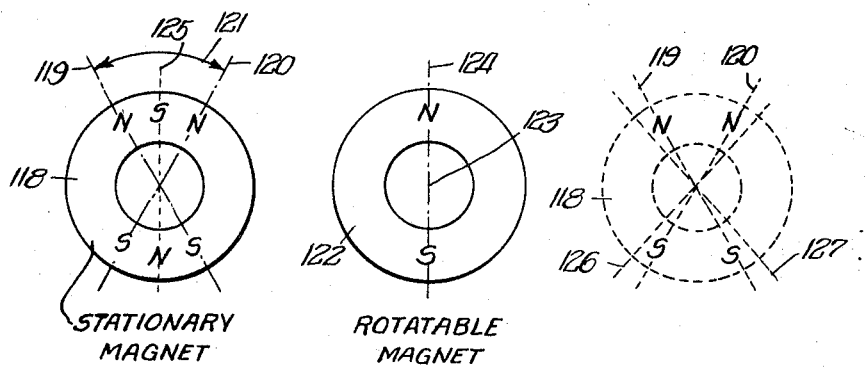
FIG. 16 is a view, somewhat diagrammatic in character, showing a modified arrangement for the poles of one of the permanent magnets to provide a construction, similar to those shown in the preceding figures without requiring the mechanical stop for limiting rotation of the relatively rotatable permanent magnet.

Referring now particularly to FIGS. 1, 2 and 6 of the drawings, it will be observed that the reference character 10 designates, generally, a predetermined current flow responsive means or a fault indicator that is arranged to be positioned adjacent conductor 11 in which direct current or alternating current may flow at any voltage ranging upwardly from the common household voltage of 115 volts to transmission line voltages of several thousand volts. In such a conductor the normal current flow may be of the order of 200 amperes. In the event that the current flow exceeds, for example, 450 amperes, this is usually the result of a fault on the line which is removed by automatic opening of circuit breakers or blowing of fuses. It is desirable to have an indication that such an amount of current has flowed in the conductor to retain the indication after the current flow ceases. It is for this purpose that the fault indicator 10 is employed.

The fault indicator 10 includes a handle 12 that may be formed of molded transparent plastic insulating material. It has a shank 13 and an aperture 14 for receiving a live line tool to be manipulated thereby for movement into and out of operative position with respect to the conductor 11. Also slots 15 are provided in opposite sides of the handle 12 for receiving a special live line tool as described in the application first above mentioned.

As shown more clearly in FIG. 6 the underside of the handle 12 is provided with a recess 16 in which an annular relatively stationary permanent magnet 17 is positioned. Preferably the permanent magnet 17 is formed of ceramic magnetic material and it is held in place in the recess 16 by a suitable adhesive. FIG. 7 shows diagrammatically the stationary permanent magnet 17 and indicates that it is provided with permanent north and south poles in diametrically opposite positions along an axis indicated by broken line 18.

Again referring to FIG. 6, it will be observed that the upper side of the handle 12 is provided with a recess 21 and a counterbore 22 the upper end of which is closed by a cover 23 of transparent plastic insulation The cover 23 is held in position on the handle 12 by screws 24 one of which is threaded into a threaded plate 25 on the underside of the handle 12 while the other is threaded into a threaded plate portion 26 of an L-shaped bracket 27 that is provided with an upstanding arm 28 the purpose of which will be presently set forth.

An annular relatively rotatable permanent magnet 29 is mounted partly in the recess 21 and partly in the counterbore 22. It is formed preferably of ceramic permanent magnet material and may be a duplicate of the stationary permanent magnet 17. The rotatable permanent magnet 29 is mounted for rotation with a hub 30 which is rotatably mounted by a pivot screw 31 in the handle 12 and a pivot screw 32 in the cover 23. The hub 30 includes an integral head 33 between the under side of which and the upper side of the rotatable permanent magnet 29 a disc 34, preferably formed of aluminum, is positioned for conjoint rotation. A spring clamp washer 35 on the under side of the relatively rotatable permanent magnet 29 holds the assembly in place.

As shown more clearly in FIGS. 4 and 5 a portion of the periphery of the aluminum disc 34 is removed to provide stop shoulders 36 and 37 that cooperate with stop means in the form of a stop pin 38 to limit rotation of the disc 34 in one direction or the other. The stop pin 38 extends upwardly from a shoulder 39, FIG. 6, at the bottom of the counterbore 22.

Referring to FIG. 7, it will be observed that the rotatable permanent magnet 29 is provided with diametrically positioned north and south poles that are located along an axis 40 which extends at right angles to its axis 41 of rotation It will be understood that the axis 41 of rotation extends centrally through the pivot screws 31 and 32 at right angles to the axis 40 of the north and south poles of the rotatable permanent magnet 29 and also at right angles to the axis 18 of the north and south poles of the relatively stationary permanent magnet 17.

In the non-indicating position of the relatively rotatable permanent magnet 29 the shoulder 37 on the disc 34 engages the stop 38 as shown in FIG. 7. The axis 40 of the north and south poles of the relatively rotatable permanent magnet 29 is shown also with reference to the axis 18 of the north and south poles of the relatively stationary permanent magnet 17. These axes are angularly spaced apart as indicated at 42. For illustrative purposes it is pointed out that this angle 42 may be of the order of 10°. Since like poles of the permanent magnets 17 and 29 are adjacent each other, they exert a repelling force which tends to rotate the relatively rotatable permanent magnet 29 in a counterclockwise direction. Since it is prevented from rotating in this direction by the stop pin 38, it will be apparent that the relatively rotatable permanent magnet 29 is held in the non-indicating positionby the repelling forces incident to the like poles of the permanent magnets 17 and 29.

As shown in FIGS. 1, 4 and 5 a target 43 is mounted and overlies a portion of the disc 34. Preferably it comprises a sector shaped piece of reflecting tape and, as indicated, it is red in color. In the indicating position of the disc 34 the target 43 is visible through a sector shaped opening 44, FIG. 3, in a mask 45 of opaque sheet material. The mask 45, which is positioned between the under side of the cover 23 and the upper side of the handle 12, is provided with apertures 46 through which the screws 24 extend.

With a view to clamping detachably the fault indicator 10 to the conductor 11 a clamp 47 is provided. The clamp 47 is generally T-shaped in configuration and is formed of ferrous metal, such as soft iron, for the purpose of reducing the reluctance around the conductor 11 when the fault indicator 10 is clamped in position as shown in FIG. 2. The clamp 37 has a clamp portion 48 that is bowed outwardly to conform, generally to the shape of the conductor 11 and is enclosed in soft rubber tubing 49 to improve the gripping action of the clamp 47 as applied to the conductor 11. The ends 50 of the clamp 47 are turned inwardly and are rotatably mounted in apertures 51 located in opposite sides of the handle 12 to provide a pivot mounting for the clamp 47. A coil tension spring 52 is connected between a shank 53 of the clamp 47 and the arm 28 of the L-shaped bracket 27 for biasing the clamp 47 to the clamped position.

Referring to FIG. 7, an arrow 54 indicates the direction of flow of direct current or half cycles of alternating current in the conductor 11. When this current flow differs from or exceeds the value required to trip the fault indicator 10 from the non-indicating to the indicating position, the magnetic field generated by such current flow reacts with the magnetic field from the north and south poles of the relatively rotatable permanent magnet 29 to such an extent that the repelling action between these poles and the north and south poles of the relatively stationary permanent magnet 17 is overcome with the result that the relatively rotatable permanent magnet 29 rotates in a clockwise direction so that the axis 40 of its north and south poles rotates past the axis 18 of the north poles of the relatively stationary permanent magnet 17 and to a position indicated by broken line 55 which is determined by the engagement of the stop shoulder 36 with the opposite side of the stop pin 38. The position of the axis or broken line 55 along which the north and south poles of the relatively rotatable permanent magnet 29 lie in the indicating position is shown with reference to the relatively stationary permanent magnet 17. Here it will be observed that unlike poles occupy positions where they are attracted and at the same time like poles of the permanent magnets 17 and 29 are repelled. These forces act to hold the stop shoulder 36 against the stop pin 38.

When the relatively rotatable permanent magnet 29 and the disc 34 carried thereby rotate to the alternate position or indicating position, the target 43 is moved into registry with the sector shaped opening 44 in the mask 45 and is visible through the cover 23 as will be apparent from FIG. 1.

As indicated on the mask 45 the fault indicator 10 is arranged to trip at 450 amperes. In other words, the magnetic field generated by a flow of 450 direct current amperes in the conductor 11 or an RMS half cycle current flow of this value through the conductor 11 in the same direction generates a unidirectional magnetic field for the time being around the conductor 11 which is capable of reacting with the magnetic field from the north and south poles of the relatively rotatable permanent magnet 29 to cause it to shift, as described, from the non-indicating to the indicating position. Flow of direct current in the opposite direction or the flow of half cycles or the alternating current in the opposite direction are incapable of effecting the shift of the relatively rotatable permanent magnet 29 from the non-indicating to the indicating position. Thus the fault indicator 10 can be employed in connection with direct current circuits to indicate reverse current flow when it exceeds the current flow required to trip the fault indicator 10.

Variations in the trip value of the fault indicator 10 can be obtained by shifting the position of the relatively stationary permanent magnet 17 with respect to the position of the relatively rotatable permanent magnet 29 in the non-indicating position. Also, variations in the trip value can be obtained by varying the magnetization of the permanent magnets 17 and 29, and their positions with respect to each other.

The relatively rotatable permanent magnet 29 will remain in the tripped position with the target 43 visible through the opening 44 in the mask 45 until it is reset. This condition continues to exist regardless of the amount of current flow in the conductor 11 or its direction.

In order to reset the relatively rotatable permanent magnet 29 a reset magnet 56, FIG. 7, is employed. For this purpose the reset magnet 56 is positioned with its north and south poles located generally opposite the locations of the north and south poles of the rotatable permanent magnet 29 in the non-indicating position and along the axis 40 shown in FIG. 7. When the reset magnet 56 is so positioned, the relatively rotatable permanent magnet 29 is promptly rotated from the position where its north and south poles lie along the axis indicated by broken line 55 to the non-indicating position as the result of the attractive forces between the north and south poles of the reset magnet 56 and the north and south poles of the relatively rotatable permanent magnet 29.

For consistent operation of the fault indicator 10 it should be positioned with the handle 12 extending at right angles to the conductor 11. In this position the axes along which the north and south poles of the relatively stationary and rotatable permanent magnets 17 and 29 lie are positioned along the current path in the conductor 11 indicated by the arrow 54.

Referring now to FIGS. 8 and 9 of the drawings, it will be observed that a portion of the handle 12 is shown in section and that it is provided with a recess 61 and a counter bore 62 which has a shoulder 63 at the bottom. Cemented in place on the shoulder 63 is an annular relatively stationary permanent magnet 64 that is formed of ceramic magnetic material and is concentric with the relatively rotatable permanent magnet 29 constructed and arranged as described above. A radial pin 65 extends inwardly from the wall of the counter bore 62 to engage the shoulder 37 on the disc 34 to position it in the non indicating position as previously described. In FIG. 9 the north and south poles of the relatively stationary permanent magnet 64 that surrounds the relatively movable permanent magnet 29 are indicated as lying along the axis indicated by the broken line 66. As described above, the repelling forces caused by the unlike poles of the rotatable and stationary permanent magnets 29 and 64 are such as to bias the former to the non indicating position from which it is displaced on flow of predetermined current in the conductor 11 in the manner described above.

In FIGS. 10, 11 and 15 there is indicated, generally, at 70 predetermined current flow responsive means or a fault indicator that is arranged to be positioned adjacent the conductor 11 in the manner above described for the fault indicator 10. The fault indicator 70 includes a handle 71 of transparent plastic material that is provided with a shank 72 and an aperture 73 for attachment to a live line stick. Recesses 74 are provided in opposite sides of the handle 71 to receive the live line tool described in the application first above referred to.

As shown in FIG. 15 a recess 75 is provided in the handle 71 the lower end of which is closed by a lower plate 76 which may be secured by suitable adhesive to the under side of the handle 71. It will be understood that the plate 76 can be molded as an integral part of the handle 71. Mounted within the recess 75 are two annular relatively stationary permanent magnets which preferably are secured in position by suitable adhesive. The permanent magnets 77 correspond to the relatively stationary permanent magnet 17 and may be duplicates thereof. The permanent magnets 77 are positioned with like poles in overlying relation in order to provide additional magnetic flux. A counter bore 80 is provided in the upper side of the handle 71 and it extends into an upper plate 81 of suitable transparent plastic material that may be secured by adhesive to the handle 71. Like the lower plate 76, the upper plate 81 can be formed integrally with the handle 71 in the molding process. A cover 82 of transparent plastic material overlies the upper plate 81 and is secured in position by screws 83.

Within the counter bore 80 there is positioned an annular relatively rotatable permanent magnet 84 which corresponds to the relatively rotatable permanent magnet 29. The permanent magnet 84 is mounted for rotation with a hub 85 the lower end of which is pivoted on a pivot screw 86 that extends through the lower plate 76. The upper end of the hub 85 is pivoted on a pivot screw 87 that extends through the cover 82. A head portion 88 is formed integrally with the hub 85 and it overlies a disc 89 of aluminum which is substantially larger in diameter than the disc 34 above described. Also positioned under the head 88 and between the under side of the disc 89 and the upper side of the relatively rotatable permanent magnet 84 is an arm 90. A spring clamp washer 91 secures the assembly in position. One side of the distal end 92 of the arm 90 is arranged to engage stop means in the form of a stop pin 93 which is mounted in the shoulder 94 of the handle 71 at the bottom of the counter bore 80. The upper plate 81 has a counter bore 96 of sufficient size to receive the large diameter disc 89.

In keeping with the larger diameter of the disc 89, a semi-circular target 97 is mounted thereon. It may be formed of pressure sensitive tape red in color and of reflecting characteristics. It is substantially larger in area than is the target 43 above described and thus is more readily visible.

The semi-circular target 97 carried by the disc 89 is visible in the indicating position through a semi-circular opening 98 in a mask 99 formed of opaque sheet material. It is shown in FIG. 12 where apertures 100 are indicated as being provided therein for receiving the screws 83.

For holding the fault indicator 70 detachably on the conductor 11 a clamp 101 is provided and it is of generally T-shape and formed of ferrous material, such as soft iron, in order to reduce the reluctance of the magnetic circuit around the conductor 11. The clamp 101 has a clamp portion 102 that is bowed outwardly to receive the conductor 11 as shown in FIG. 15. The ends 103 of the clamp 101 are turned inwardly and project into apertures 104 in the sides of the handle 171 where they are rotatably mounted. Torsion springs 105 are positioned around the outer ends of the end portions 103 with one end 106 of each reacting against the adjacent side of the upper plate 81 while the other end 107 of each reacts against the respective oppositely extending end portions 108 of the clamp 101.

It is desirable that the application of the fault indicator 70 to the conductor 11 be facilitated. For this purpose a rectangular strut 111 is provided. It is formed of non-ferrous material such as brass. The inturned ends 112, FIG. 10, of the strut 111 extend into apertures 113 in the opposite sides of the handle 71 while the central portion 114, as shown in FIG. 11, is arranged to react against the clamp portion 102.

When the fault indicator 70 is moved in the direction indicated by the arrow 115 toward the conductor 11 with the strut 111 holding the clamp 101 open, engagement of the conductor 11 by the strut 111 and continued movement of the fault indicator 70 in the direction of the arrow 115 causes the strut 111 to move out of supporting relation to the clamp 101 with the result that the torsion springs 105 are able to swing the clamp 101 into clamping engagement with the conductor 11.

The relationship between the north and south poles of the relatively stationary permanent magnet 77 and the relatively rotatable permanent magnet 84 are essentially the same as described above for the relatively stationary permanent magnet 17 and the relatively rotatable permanent magnet 29. However, experience indicates that the angle between the axes of these poles, indicated at 42 in FIG. 7 and described above as being of the order of 10°, is of the order of 4° for the fault indicator 70.

In the non-indicating position of the fault indicator 70, one side of the distal end 92 of the arm 90, as shown in FIG. 14, bears against the stop pin 93. The relatively rotatable permanent magnet 84 and the disc 89 carrying the target 97 thereon are held in this position by the repelling forces of the like poles of the permanent magnets. In this position the target 97 is concealed by the lower opaque portion of the mask 99.

When the current flow in the conductor 11 exceeds the trip value, for example 500 amperes, for which the fault indicator 70 is set, the action is as described above and the repelling action between the poles of the relatively stationary and rotatable permanent magnets is overcome by the magnetic field generated by the current flow through the conductor 11. The rotatable permanent magnet 84 and the disc 89 then rotate in a clockwise direction through substantially a complete semicircle to position the target 97 in registry with the semicircular opening 98. This position is shown in FIG. 13.

In order to reset the fault indicator 70, the reset magnet 56 is employed. It is positioned with its north and south poles adjacent the opposite poles of the relatively rotatable permanent magnet 84, the reset magnet 56 being positioned above the upper surface of the cover 82. It is manually rotated generally about the axis of rotation of the relatively rotatable permanent magnet 84 in a counterclockwise direction to restore the disc 89 and the target 97 to the non-indicating position.

The fault indicator 70, like the fault indicator 10, is responsive only to flow of direct current in the conductor 11 in one direction or to both half cycles of alternating current that flow in the same direction. It follows that the fault indicator 70 can also be employed to indicate flow of reverse direct current, if desired.

FIG. 16 shows a further modification of the invention that can be employed in any of the constructions previously described for making the indicators responsive to predetermined current flow in either direction in the conductor 11. This is accomplished by dispensing with the stop pin 38 for the construction shown in FIGS. 1 to 7, the stop pin 65 for the construction shown in FIGS. 8 and 9, and the stop pin 93 for the construction shown in FIGS. 10 to 15.

As shown in FIG. 16 an annular relatively stationary permanent magnet 118 is provided that corresponds, for example, to the annular relatively stationary permanent magnet 17 and is similarly mounted in a handle such as the handle 12. However, the relatively stationary permanent magnet 118 is provided with two sets of diametrically disposed north and south poles that are located along axes 119 and 120 with like poles adjacent each other and the axes at an acute angle indicated at 121 of the order of 60°.

The relatively stationary permanent magnet 118 can be mounted below or concentrically with an annular relatively rotatable permanent magnet 122 which corresponds to and may be identical with the relatively rotatable permanent magnet 29 and mounted in a similar manner and provided with a similar target 43. The rotatable permanent magnet 122 is arranged to rotate about an axis 123 which is perpendicular to and intersects the axes 119 and 120 and also is perpendicular to an axis 124 along which the north and south poles of the relatively rotatable permanent magnet 122 lie. In the non-indicating position of the relatively rotatable permanent magnet 122, its north and south poles lie along an axis indicated by broken line 125 shown in conjunction with a relatively stationary permanent magnet 118. Here it will be observed that the north pole of the relatively rotatable permanent magnet 122 is repelled in opposite directions by the two north poles of the relatively stationary permanent magnet 118. The same is true for the south pole of the relatively rotatable permanent magnet 122. As a result the relatively rotatable permanent magnet and parts rotating therewith are held in what is referred to as the non-indicating position by the repelling forces incident to the like poles of the relatively stationary and rotatable permanent magnets 118 and 122.

Now when the minimum trip current flows through the conductor 11 in either direction, the magnetic field generated thereby reacts with the flux from the north and south poles of the relatively rotatable permanent magnet 122 with sufficient force to overcome the repelling action above referred to and to rotate the relatively rotatable permanent magnet 122 in either a clockwise or a counterclockwise direction, depending upon the direction of current flow in the conductor 11. By broken lines in FIG. 16 the position of the relatively stationary permanent magnet 118 is shown with respect to the axis of the north and south poles of the relatively rotatable permanent magnet 122 in one indicating position or the other, depending upon the direction of current flow in the conductor 11. The broken line 126 indicates the line along which the north and south poles of the relatively rotatable permanent magnet 122 lie when the current flow in the conductor 11 is in such a direction as to cause it to rotate in a counterclockwise direction. The broken line 127 indicates the line along which the north and south poles of the relatively rotatable permanent magnet 122 lie when the current flow is in such a direction as to cause the relatively rotatable permanent magnet 122 to rotate in a clockwise direction. For illustrative purposes these axes are shown as being spaced slightly from the axes 119 and 120 of the north and south poles of the relatively stationary permanent magnet 118. In either case the relatively rotatable permanent magnet 122 is held in the indicating position by the attractive forces of one or the other pairs of north and south poles of the relatively stationary permanent magnet 118. The reset magnet 56 is employed for restoring the relatively rotatable permanent magnet 122 to the non-indicating position.

While the relatively stationary permanent magnet 118 has been described as being provided with the two pairs of north and south poles and the relatively rotatable permanent magnet 122 has been described as being provided with a single pair of diametrically located north and south poles, it will be understood that these pole arrangements can be reversed with two poles being provided on the relatively stationary permanent magnet 118 and the two sets of poles being provided on the relatively rotatable permanent magnet 122. In either case, it is unnecessary to employ the mechanical stop pins above referred to since their place is taken by one or the other of the two sets of north and south poles on the one or the other of the permanent magnets 118 and 122.

In view of the proximity of like poles along the axes 119 and 120, they tend to function as single pole. In order to insure that separate and distinct like poles are provided, relatively weaker south and noth poles are induced in the relatively stationary permanent magnet 118 along the axis 125 and intermediate the pairs of like north and south poles respectively. This arrangement facilitates the retention of the relatively rotatable permanent magnet 122 in the non-indicating position with its magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

4. Means responsive to flow of predetermined current in a conductor comprising: a relatively stationary permanent magnet having its north and south poles located along an axis, means for mounting said stationary permanent magnet, clamp means for detachably holding said mounting means adjacent said conductor so that said axis of said permanent magnet is positioned generally along the path of current flow therein and subject to the magnetic flux generated by such current flow; said clamp means including a spring biased clamp member pivoted at one end to said mounting means and arranged intermediate its ends to clamp said conductor, and a strut pivoted at one end to said mounting means and arranged to engage and hold said clamp member in unclamped position until displaced by relative movement of said conductor and said mounting means; a relatively rotatable permanent magnet on said mounting means with is axis of rotation intersecting the axis along which its north and south poles lie and also intersecting said axis of said poles of said relatively stationary permanent magnet, and stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

5. Means responsive to flow of predetermined current in a conductor comprising: a relatively stationary permanent magnet having its north and south poles located along an axis, means for mounting said stationary permanent magnet, clamp means for detachably holding said mounting means adjacent said conductor so that said axis of said permanent magnet is positioned generally along the path of current flow therein and subject to the magnetic flux generated by such current flow; said clamp means including a spring biased clamp member pivoted at one end to said mounting means and arranged intermediate its ends to clamp said conductor, and a strut pivoted at one end to said mounting means and arranged to engage and hold said clamp member in unclamped position until displaced by relative movement of said conductor and said mounting means, said clamp member being formed of ferrous metal and said strut being formed of non-ferrous material; a relatively rotatable permanent magnet on said mounting means with its axis of rotation intersecting the axis along which its north and south poles lie and also intersecting said axis of said poles of said relatively stationary permanent magnet, and stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

6. Means responsive to flow of predetermined current in a conductor comprising: a relatively stationary permanent magnet having its north and south poles located along an axis, means for mounting said stationary permanent magnet adjacent said conductor so that said axis is positioned therealong and subject to the magnetic flux generated by current flow therein, a relatively rotatable permanent magnet on said mounting means with its axis of rotation intersecting the axis along which its north and south poles lie and also intersecting said axis of said poles of said relatively stationary permanent magnet, stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets, and additional stop means cooperating with said relatively rotatable permanent magnet to prevent rotation thereof beyond said second position.

7. Means responsive to flow of predetermined current in a conductor comprising: a relatively stationary permanent magnet having its north and south poles located along an axis, means for mounting said stationary permanent magnet adjacent said conductor so that said axis is positioned therealong and subject to the magnetic flux generated by current flow therein, a relatively rotatable permanent magnet on said mounting means with its axis of rotation intersecting the axis along which its north and south poles lie and also intersecting said axis of said poles of said relatively stationary permanent magnet, stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets, and a target movable with said relatively rotatable permanent magnet to show whether it is in said first or said second position.

8. Means responsive to flow of predetermined current in a conductor comprising: a relatively stationary permanent magnet having its north and south poles located along an axis, means for mounting said stationary permanent magnet adjacent said conductor so that said axis is positioned therealong and subject to the magnetic flux generated by current flow therein, a relatively rotatable permanent magnet on said mounting means with its axis of rotation intersecting the axis along which its north and south poles lie and also intersecting said axis of said poles of said relatively stationary permanent magnet, stop means cooperating with said relatively rotatable permanent magnet to prevent rotation thereof from a first position in which it is held under the influence of the repelling forces incident to repulsion of said like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets; a north and south poles overlying, respectively, the south and north poles of the stationary magnet 118 which are located along the axis 125.

FIG. 18 shows diagrammatically a further modification of the arrangement shown in FIG. 16. Here an annular relatively stationary permanent magnet 128 is provided which corresponds to the relatively stationary permanent magnet 17 and can be mounted in a similar manner. The permanent magnet 128 is provided with a single pair of north and south poles that are located diametrically on axis 129. Associated with the relatively stationary permanent magnet 128 is an annular relatively rotatable permanent magnet 130 that corresponds to the relatively rotatable permanent magnet 29 and is mounted in a similar fashion. The rotatable permanent magnet 130 has diametrically located north and south poles positioned along an axis 131 which extends at right angles to an axis 132 which is the pivot axis of the rotatable permanent magnet 130.

When sufficient current flows through the conductor 11, permanent magnet 130 in the non-indicating position, a ferrous plate 133 of soft iron is positioned in overlying relation to the relatively stationary permanent magnet 128 symmetrically along the axis 129 and between the magnets 128 and 130. The ferrous plate 133 can extend to the periphery of the stationary permanent magnet 128 but, in order to show the north and south poles of the permanent magnet 128, it is shown slightly shorter than the diameter of the permanent magnet 128.

When the rotatable permanent magnet 130 occupies the non-indicating position with respect to the stationary permanent magnet 128, the like poles are opposite each other and, in these positions, they induce opposite poles as indicated at 134 and 135 in the ends of the ferrous plate 133. As a result the relatively rotatable permanent magnet 130 is held in the non-indicating position as a result of the attractive forces between its north and south poles along the axis 131 and the south and north poles induced in the ferrous plate 133.

Figure 17:
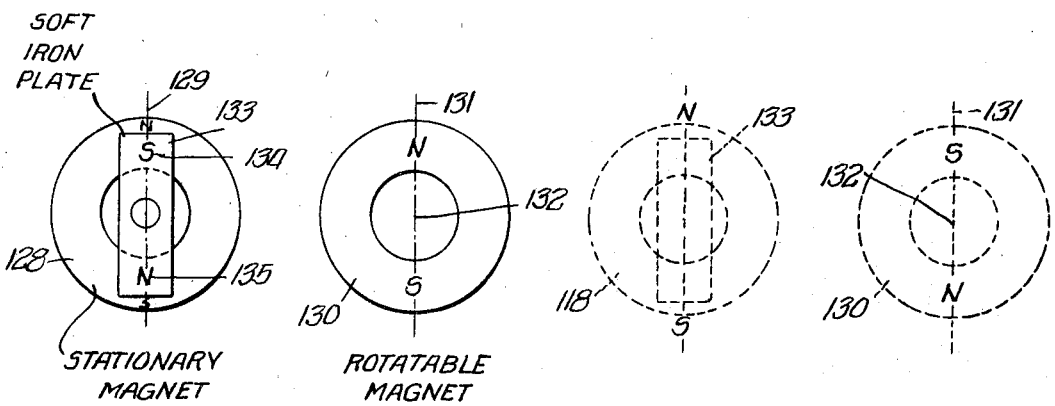
FIG. 17 is a view, similar to FIG. 16, showing another modified arrangement for the poles of the permanent magnet.

When sufficient current flow through the conductor 11, either alternating or direct and without regard to direction of current flow, the interaction between the magnetic flux from the north and south poles of the relatively rotatable permanent magnet 130 and the magnet flux generated by the current flow is such as to cause the magnet 130 to rotate in one direction or the other, depending upon the direction of current flow. In the indicating position of the relatively rotatable permanent magnet 130, its north and south poles are shifted through 180° to the position shown by broken lines to the right of FIG. 17. In the indicating position the south and north poles of the relatively rotatable permanent magnet 130 overlie the north and south poles respectively of the relatively stationary permanent magnet 128, also shown by broken lines. The relatively rotatable permanent magnet 130 is held in the indicating position in this manner until it is reset in the manner described above.

In the indicating position of the relatively rotatable permanent magnet 130, the flux path between the north and south poles of the permanent magnets 128 and 130 is perpendicular to the ferrous plate 133 rather than along it as is the case for the non-indicating position. As a result, the opposite poles above referred to are not induced in the ferrous plate 133 when the relatively rotatable permanent magnet 130 is in the indicating position.

The relatively rotatable permanent magnet shown in connection with any of the embodiments of the invention and the parts movable therewith are substantially unaffected by the flow of transient current in the conductor 11 where such flow is of the order of microseconds. The reason for this is that the inertia of the moving parts is such that they are substantially unaffected by the magnetic field that is generated incident to such current flow. Any of the modifications of this invention can be employed and reliance placed on the fact that they will be responsive substantially only to the flow of direct current or alternating current of the order of 60 cycles per second. They are substantially unaffected by current flow due to lightning surges, switching surges and the like.

What is claimed as new is:

1. Means responsive to flow of predetermined current in a conductor comprising: a relatively stationary permanent magnet having its north and south poles located along an axis, means for mounting said stationary permanent magnet adjacent said conductor so that said axis is positioned therealong and subject to the magnetic flux generated by current flow therein, a relatively rotatable permanent magnet on said mounting means with its axis of rotation intersecting the axis along which its north and south poles lie and also intersecting said axis of said poles of said relatively stationary permanent magnet, and stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it held under the influence of the attracting forces incident to attraction of unlike poles of said permanent magnets.

2. Means responsive to flow of predetermined current in a conductor comprising: a relatively stationary permanent magnet having its north and south poles located along an axis, means for mounting said stationary permanent magnet, clamp means for detachably holding said mounting means adjacent said conductor so that said axis of said permanent magnet is positioned generally along the path of current flow therein and subject to the magnetic flux generated by such current flow, a relatively rotatable permanent magnet on said mounting means with its axis of rotation intersecting the axis along which its north and south poles lie and also intersecting said axis of said poles of said relatively stationary permanent magnet, and stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

3. Means responsive to flow of predetermined current in a conductor comprising: a relatively stationary permanent magnet having its north and south poles located along an axis, means for mounting said stationary permanent magnet, clamp means for detachably holding said mounting means adjacent said conductor so that said axis of said permanent magnet is positioned generally along the path of current flow therein and subject to the magnetic flux generated by such current flow, said clamp means including a ferrous metal member for extending in the clamped position partially around said conductor to reduce the reluctance of the magnetic flux path around said conductor, a relatively rotatable permanent magnet on said mounting means with its axis of rotation intersecting the axis along which its north and south poles lie and also intersecting said axis of said poles of said relatively stationary permanent magnet, and stop means cooperating with said relatively rotatable permanent magnet to prevent rotation thereof from a first position in which it is held under the influence of the repelling forces incident to repulsion of like poles of said permanent target movable with said relatively rotatable permanent magnet to show whether it is in said first or said second position, and a mask overlying said target having a window so located that said target is visible through said window when said rotatable permanent magnet is in said second position.

9. Means responsive to flow of predetermined current in a conductor comprising: an annular relatively stationary permanent magnet having diametrically located north and south poles along an axis, means for mounting said stationary permanent magnet adjacent said conductor so that said axis is positioned therealong and subject to the magnetic flux generated by current flow therein, an annular relatively rotatable permanent magnet on said mounting means having diametrically located north and south poles along an axis at right angles to its axis of rotation which also intersects at right angles said axis of said poles of said stationary magnet, and stop means cooperating with said relatively rotatable permanent magnet to prevent rotation thereof from a first position in which it is held under the influence of the repelling forces incident to repulsion of like poles of said permanent magnets, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

10. The invention, as set forth in claim 9, wherein the stationary and rotatable permanent magnets are positioned one above the other.

11. The invention, as set forth in claim 9, wherein the stationary and rotatable permanent magnets are concentrically arranged.

12. Means responsive to flow of predetermined current in a conductor comprising: relatively stationary and rotatable permanent magnets, and means for mounting said permanent magnets adjacent said conductor so that the axes of the north and south poles thereof are positioned therealong and subject to the magnetic flux generated by current flow therein, one of said permanent magnets having pairs of north and south poles located respectively along axes intersecting at an acute angle which axes also intersect the axis of rotation of said rotatable permanent magnet and with like poles adjacent each other, the other of said permanent magnets having its north and south poles lying along an axis intersecting said axis of rotation of said rotatable permanent magnet, in a first position of said rotatable permanent magnet said axis along which said north and south poles of said other permanent magnet lie being located intermediate said axes of said north and south poles of said one permanent magnet with said north and south poles of said other permanent magnet being repelled respectively by like poles of said one permanent magnet and thereby held in said first position, the magnetic flux generated by predetermined curret flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

13. Means responsive to flow of predetermined current in a conductor comprising: a relatively stationary permanent magnet having pairs of north and south poles located respectively along axes intersecting at an acute angle with like poles adjacent each other, means for mounting said stationary permanent magnet adjacent said conductor so that said axes are positioned therealong and subject to the magnetic flux generated by current flow therein; and a relatively rotatable permanent magnet on said mounting means with its axis of rotation intersecting the axis along which its north and south poles lie and also intersecting said axes of said poles of said relatively stationary permanent magnet, said relatively rotatable permanent magnet in a first position having said axis of its north and south poles located intermediate said axes of said north and south poles of said relatively stationary magnet and its north and south poles repelled respectively by like poles of said relatively stationary magnet and thereby held in said first position, the magnetic flux generated by predetermined current flow in said conductor cooperating with the magnetic flux of said relatively rotatable permanent magnet to overcome said repelling forces and to cause said relatively rotatable permanent magnet to rotate from said first position to a second position in which it is held under the influence of the attracting forces incident to attraction of unlike poles of said permanent magnets.

14. Means responsive to flow of predetermined current in a conductor comprising: relatively stationary and rotatable permanent magnets, and means for mounting said permanent magnets adjacent said conductor so that the axes of the north and south poles thereof are positioned therealong and subject to the magnetic flux generated by current flow therein, one of said permanent magnets having pairs of north and south poles located respectively along axes intersecting at an acute angle which axes also intersect the axis of rotation of said rotatable permanent magnet with like poles adjacent each other and a pair of north and south poles along an axis intermediate and intersecting said axes with the south pole between said pair of north poles and the north pole between said pair of south poles, the other of said permanent magnets having its north and south poles lying along an axis intersecting said axis of rotation of said rotatable permanent magnet, in a first position of said rotatable permanent magnet said axis along which said north and south poles of said other permanent magnet lie being located intermediate said axes of said north and south poles of said one permanent magnet with said north and south poles of said other permanent magnet being repelled respectively by like poles of said one permanent magnet and attracted by unlike poles thereof and thereby held in said first position, the magnetic flux generated by predetermined current flow in said conductor cooperating with the magnetic flux of said relatively rotatable permanent magnet to overcome said repelling and attracting forces and to cause said relatively rotatable permanent magnet to rotate from said first position to a second position in which it is held under the influence of the attracting forces incident to attraction of unlike poles of said permanent magnets.

15. Means responsive to flow of predetermined current in a conductor comprising: a relatively stationary permanent magnet having pairs of north and south poles located respectively along axes intersecting at an acute angle with like poles adjacent each other and a pair of north and south poles along an axis intermediate and intersecting said axes with the south pole between said pair of north poles and the north pole between said pair of south poles, means for mounting said stationary permanent magnet adjacent said conductor so that said axes are positioned therealong and subject to the magnetic flux generated by current flow therein; and a relatively rotatable permanent magnet on said mounting means with its axis of rotation intersecting the axis along which its north and south poles lie and also intersecting said axes of said poles of said relatively stationary permanent magnet, said relatively rotatable permanent magnet in a first position having said axis of its north and south poles located intermediate said axes of said north and south poles of said relatively stationary magnet and its north and south poles repelled respectively by like poles of said relatively stationary magnet and attracted by unlike poles thereof and thereby held in said first position, the magnetic flux generated by predetermined current flow in said conductor cooperating with the magnetic flux of said relatively rotatable permanent magnet to overcome said repelling and attracting forces and to cause said relatively rotatable permanent magnet to rotate from said first position to a second position in which it is held under the influence of the attracting forces incident to attraction of unlike poles of said permanent magnets.

16. Means responsive to flow of predetermined current in a conductor comprising: a relatively stationary permanent magnet having its north and south poles located along an axis, means for mounting said stationary permanent magnet adjacent said conductor so that said axis is positioned therealong and subject to the magnetic flux generated by current flow therein, a relatively rotatable permanent magnet on said mounting means with its axis of rotation intersecting the axis along which its north and south poles lie and also intersecting said axis of said poles of said relatively stationary permanent magnet, and stop means in the form of a stationary soft iron member between said permanent magnets and along said axis of said relatively stationary permanent magnet in which poles of opposite polarity are induced when like poles of said permanent magnets are located in proximity to each other, said stop means cooperating with said relatively rotatable permanent magnet to prevent rotation thereof from a first position in which it is held under the influence of the attracting forces incident to attraction of like poles of said soft iron member and said relatively rotatable permanent magnet, the magnetic flux generated by predetermined current flow in said conductor cooperating with the magnetic flux of said relatively rotatable permanent magnet to overcome said attracting forces and to cause said relatively rotatable permanent magnet to rotate from said first position to a second position in which it is held under the influence of the attracting forces incident to attraction of unlike poles of said permanent magnets.

References Cited

UNITED STATES PATENTS

| | | | |
|---|---|---|---|
| 1,724,973 | 8/1929 | Shann | 324—52 |
| 1,942,052 | 1/1934 | Foust et al. | 324—103 |
| 2,367,299 | 1/1945 | McLarn et al. | |
| 2,722,581 | 11/1955 | Wittke | 335—81 |
| 2,779,927 | 1/1957 | Rudge | 324—127 XR |
| 3,074,060 | 1/1963 | Kadlec | 340—373 |
| 3,158,796 | 11/1964 | Musgrave | 335—230 |

RUDOLPH V. ROLINEC, *Primary Examiner.*

GERARD R. STRECKER, *Assistant Examiner.*